US009184775B2

(12) United States Patent
Reinhardt

(10) Patent No.: US 9,184,775 B2
(45) Date of Patent: Nov. 10, 2015

(54) METHODS AND APPARATUS FOR ADAPTIVE NONLINEAR COINCIDENT INTERFERENCE CANCELLATION

(71) Applicant: Raytheon Company, Waltham, MA (US)

(72) Inventor: Victor S. Reinhardt, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/934,254

(22) Filed: Jul. 3, 2013

(65) Prior Publication Data

US 2015/0011172 A1    Jan. 8, 2015

(51) Int. Cl.
| | |
|---|---|
| H03D 1/04 | (2006.01) |
| H03D 1/06 | (2006.01) |
| H04B 1/10 | (2006.01) |
| H04B 1/12 | (2006.01) |

(52) U.S. Cl.
CPC .................. *H04B 1/12* (2013.01); *H04B 1/109* (2013.01); *H04B 1/1027* (2013.01); *H04B 1/123* (2013.01)

(58) Field of Classification Search
CPC ........ H04B 1/12; H04B 1/109; H04B 1/1027; H04B 1/123
USPC ............................................ 375/346; 455/296
See application file for complete search history.

(56) References Cited

U.S. PATENT DOCUMENTS

| | | | | |
|---|---|---|---|---|
| 3,541,446 | A | * | 11/1970 | Prozeller ..................... 324/99 D |
| 5,266,952 | A | | 11/1993 | Stone et al. |
| 6,147,979 | A | * | 11/2000 | Michel et al. ................. 370/292 |
| 6,219,390 | B1 | | 4/2001 | Prasanna |
| 6,535,554 | B1 | | 3/2003 | Webster et al. |
| 6,816,541 | B1 | * | 11/2004 | Schmidl ........................ 375/148 |
| 7,068,743 | B1 | * | 6/2006 | Suzuki .......................... 375/345 |
| 8,401,509 | B1 | * | 3/2013 | Gupta et al. ................... 455/296 |
| 2003/0098806 | A1 | | 5/2003 | Green |
| 2006/0062166 | A1 | | 3/2006 | Jones et al. |
| 2006/0188089 | A1 | * | 8/2006 | Diethorn et al. ......... 379/406.01 |
| 2010/0046660 | A1 | * | 2/2010 | Sikri et al. .................... 375/285 |
| 2010/0124289 | A1 | * | 5/2010 | Yonge et al. .................. 375/257 |
| 2011/0305303 | A1 | | 12/2011 | Sikri et al. |

(Continued)

FOREIGN PATENT DOCUMENTS

| | | |
|---|---|---|
| EP | 1 063 778 | 1/2005 |
| EP | 1 841 084 A2 | 10/2007 |
| EP | 1 011 205 | 8/2009 |
| EP | 2 280 492 A1 | 2/2011 |
| EP | 2 472 734 | 7/2012 |

OTHER PUBLICATIONS

Notification of Transmittal of the International Search Report and the Written Opinion of the International Searching Authority, or the Declaration, PCT/US2014/038105, date of mailing Aug. 21, 2014, 4 pages.

(Continued)

*Primary Examiner* — Nader Bolourchi
(74) *Attorney, Agent, or Firm* — Daly, Crowley, Mofford & Durkee, LLP

(57) ABSTRACT

Methods and apparatus to cancel an interfering signal using an analog cancellation stage followed by a digital cancellation stage. In an exemplary embodiment, the interfering signal is processed to determine modulation type for removal in the analog domain. The digital stage provides further interference reduction in the digital domain.

17 Claims, 5 Drawing Sheets

(56) References Cited

U.S. PATENT DOCUMENTS

| | | |
|---|---|---|
| 2012/0093269 A1 | 4/2012 | Yu et al. |
| 2012/0155411 A1* | 6/2012 | Ancora et al. ............... 370/329 |
| 2012/0201153 A1 | 8/2012 | Bharadia et al. |
| 2012/0250806 A1 | 10/2012 | Zhang et al. |
| 2012/0287968 A1 | 11/2012 | Gainey et al. |
| 2013/0343437 A1* | 12/2013 | Li et al. ...................... 375/211 |

OTHER PUBLICATIONS

Written Opinion of the International Searching Authority, PCT/US2014/038105, date of mailing Aug. 21, 2014, 7 pages.
U.S. Appl. No. 14/035,982, filed Sep. 25, 2013, 25 pages.
U.S. Appl. No. 14/035,982, filed Sep. 25, 2013, Narumi.
U.S. Appl. No. 14/035,982 Notice of Allowance dated Sep. 8, 2014, 11 pages.

* cited by examiner

METHODS AND APPARATUS FOR ADAPTIVE NONLINEAR COINCIDENT INTERFERENCE CANCELLATION

BACKGROUND

As is known in the art, the reception and demodulation of desired signals is limited by the presence of high levels of in-band interference. Modern receivers convert analog input waveforms into digital waveforms at some point in order to take advantage of enhanced digital technologies. This conversion process is performed by an analog to digital converter (ADC). As is known in the art, the level of in-band interference that can be tolerated in these digital receivers is often limited by the actual or effective number of bits (ENoB) of this ADC.

Digital post-processing, especially adaptive interference post-processing, can greatly reduce the impact of in-band interference on recovered signal integrity, but only if the ratio of interference to signal levels are within dynamic range limitations imposed by the digitizing ADC's ENoB. When in-band interfering signals are very large, the gain in front of this ADC must be reduced to keep the ADC from saturating. This can reduce the desired signal to the point where ADC ENoB limitations degrade the ability to recover the signal properly. Mono-bit ADC techniques, which utilize a saturating 1-bit "ADC" to generate a 1-bit word sample-stream, avoid these pitfalls, but such techniques reduce the signal-to-noise ratio by approximately 2 dB and break down when one or a few large interferers dominate.

Conventional analog or digital interference cancellation techniques generally rely on frequency, spatial, temporal, or code discrimination to separate interference from desired signals for cancellation purposes. Such techniques generally utilize linear cancellation methods, which reduce signal as well as interference levels when there is near or complete signal-interference coincidence. This is due to lack of orthogonality between the signal and interferer in a linear space as coincidence is approached.

While prior art systems use analog cancellation, this analog cancellation has historically been limited to 20 to 30 dB due to imperfections in and differences between analog components in the analog cancellation path.

SUMMARY

The present invention provides methods and apparatus for achieving a high degree of adaptive coincident interference cancellation without degrading signals of interest when the incoming interference to signal ratio is high. Exemplary embodiments of the invention are adaptive in the sense that new previously unknown interferers are detected, their characteristics are determined, and these new interferers are adaptively cancelled during operation. In exemplary embodiments, an input signal includes an analog waveform comprising signals of interest and interference contained in a common radio frequency (RF) or intermediate frequency (IF) band. An output includes a digitized common waveform comprising these same signals with the interference removed to a high degree.

In an exemplary embodiment, an interference cancelling system comprises first and second stages and a common digital signal processor. The first stage adaptively identifies interferers and their characteristics and performs pre-signal-digitizing ADC analog interference cancellation to mitigate the dynamic range limitations imposed by ADC effective number of bit (ENoB) limitations. This stage utilizes a pre-cancel interference measurement ADC and a common digital signal processor to first detect, characterize, and model the interferers present in the common waveform. After interference characterization, the signal processor makes a nonlinear hard-decision as to the specific modulation type (MT) of each detected interferer, and generates a time-domain waveform model for each interferer with adjustable parameters appropriate to its MT. The sum of these model waveforms is projected forward in time and reproduced in the analog domain utilizing an interference cancellation digital-to-analog converter (DAC). This projected analog cancellation waveform is then used to cancel the interferers in real-time, just before a post-cancellation signal-digitizing ADC. In parallel, the processor utilizes feedback from this signal-digitizing ADC to determine the level of cancellation achieved and to adaptively adjust parameters in the interference models to maximize the analog interference cancellation. In one embodiment, digital calibration tables stored in the digital processor are also utilized in this analog cancellation process to compensate for imperfections in and differences between analog components in the analog cancellation path, improving analog interference cancellation.

In exemplary embodiments of the invention, the ADCs and DAC contain processor-controlled variable gain elements to optimize ADC and DAC resolutions as adaptive cancellation is achieved. Thus, the gain of the interference ADC is set low, so high-levels of interference do not saturate this ADC, while the gain of the signal ADC is set high to take advantage of the analog cancellation. This extends the dynamic range of the receiver significantly beyond limits imposed by the ENoB of the signal ADC, if it were utilized alone.

In exemplary embodiments of the invention, the above interference cancellation technique is also repeated in a second digital cancellation stage to increase the total interference cancellation of the invention significantly beyond that achievable by analog cancellation alone. This second stage utilizes the digital output of the signal ADC to perform this second cancellation in the digital domain.

The nonlinear MT-based nature of the cancellation utilized minimizes inadvertent signal reductions as maximum cancellation of coincident interference is achieved. Only parameters appropriate to each MT are adjusted in cancellation feedback loops, minimizing signal reduction due to non-orthogonality of the desired signals and coincident interference.

There are typically two types of interferers of concern to be cancelled—those with completely predictable repetitive waveforms (after they are characterized), such as radar signals, and those that contain non-predictable data symbols, such as communications signals. Predictable interference waveforms can be projected forward for real-time cancellation without difficulty. However, interference waveforms containing non-predictable data symbols present a real-time cancellation problem as these data symbols change. To aid in the real-time cancellation of such signals, an analog delay-line can be included in the signal path between the interference ADC and the analog cancellation point. This delays the signal between measurement and cancellation to provide time for the processor to measure the unpredicted symbol change and correct for it before the signal ADC. In exemplary embodiments, a precise time and frequency reference (PTFR) is also utilized to allow the accurate forward projection of the cancellation signals.

In exemplary embodiments of the invention, the second stage augments the coarse interference cancellation of the first analog stage by providing additional digital cancellation similar in operation to that of the analog cancellation, but implemented in the digital domain. Such digital cancellation is not susceptible to analog component limitations and can achieve even higher levels of interference cancellation and is especially effective after first-stage interference level reduction. In an exemplary embodiment, the combined analog and digital cancellation stages working together are expected to provide about 60 dB of total interference cancellation without degrading desired signal levels, greatly extending the dynamic range of receivers and demodulators.

It is understood that, as used herein, in-band interference refers to interference that is in the pre-ADC filter bandwidth of the signal digitizing ADC. It is also understood that, as used herein, dynamic range means the ratio of the largest in-band interfering signal power to the minimum detectable power for a signal of interest.

In one embodiment, an interference cancellation system uses hybrid analog/digital techniques to cancel interference before the signal ADC, and uses digital processing to enhance the cancellation process and provide further digital post-processing. In one particular embodiment, a system uses nonlinear models for cancellation that only allow detection and adjustment of parameters appropriate to the identified interference modulation model (e.g., for radar, pulse sync, rate, width, chirp rate, carrier frequency and phase, etc). This is distinguished from linear modeling, which relies on the orthogonality between the interference and signal in a linear space to achieve separation and selective cancellation. In the linear technique, signal, as well as interference, can be cancelled due to imperfect modulation orthogonality. In the nonlinear technique, only the waveform appropriate to the characterized interference modulation is subtracted. This reduces signal cancellation as the interference is cancelled. In one particular embodiment, a system utilizes digital calibration tables to compensate for analog components imperfections, improving analog interference cancellation.

In one aspect of the invention, a system comprises: an analog cancellation stage to receive an input signal having a signal of interest and an interfering signal, comprising: a first ADC to digitize the input signal, a first signal processing module to process the digitized input signal, a first cancellation signal generator coupled to the first signal processing module for generating a first cancellation signal based upon at least one characteristic of the interfering signal to remove at least a portion of the interfering signal, a DAC to transform the first cancellation signal to the analog domain, and an analog removal module coupled to the DAC to remove the first cancellation signal from the analog input signal and provide an analog output signal, a second ADC coupled to the analog cancellation stage to receive the analog output signal and generate a digital output signal, and a digital cancellation stage coupled to an output of the second ADC, the digital cancellation stage comprising: a second signal processing module to process the digital output signal from the second ADC, a second cancellation signal generator coupled to the second signal processing module, and a digital interference removal module coupled to the output of the second ADC and to the second cancellation signal generator module for removing at least a portion of the interfering signal that remains after removal by the analog removal module.

The system can further include one or more of the following features: the first signal processing module comprises a matched filter module, the first signal processing module comprises a signal database, the first signal processing module comprises analog cancellation loops, a feedback path from the first signal processing module to the digital cancellation stage, a time and frequency reference module, and/or the analog removal module comprises a summer.

In another aspect of the invention, a method comprises: digitizing an analog input signal having signal of interest and an interfering signal, generating a first cancellation signal based upon at least one characteristic of the interfering signal to remove at least a portion of the interfering signal, transforming the first cancellation signal to the analog domain, removing the first cancellation signal from the analog input signal and providing an analog output signal, generating a digital output signal from the analog output signal, generating a second cancellation signal from the digital output signal and at least one characteristic of the interfering signal to remove remaining portions of the interfering signal, and removing the second cancellation signal from the digital output signal and providing an in interference-cancelled output signal.

The method can further include one or more of the following features: using feedback from analog cancellation to enhance digital cancellation, the at least one characteristic of the interfering signal includes modulation type, performing modulation type detection and characterization using at least one of: pulse amplitude detection, fast Fourier transform (FFT), autocorrelation, Loëve spectrum, or Wigner-Ville functions, using a historical signal information to create the first cancellation signal, delaying the analog input signal prior to removing the first cancellation signal from the analog input signal and providing an analog output signal, and/or using a summer for removing the first cancellation signal from the analog input signal and providing an analog output signal.

In a further aspect of the invention, a system comprises: a first means for cancelling to receive an is input signal having a signal of interest and an interfering signal and cancel the interfering signal from the input signal in the analog domain based on at least one characteristic of the interfering signal, and a second means for cancelling to receive an output from the first means having the signal of interest and remaining portions of the interfering signal, the second means to further remove the remaining interfering signal in the digital domain.

The system can further include one or more of the following features: a feedback means to provide feedback to the second means for cancelling from the first mean for cancelling to increase cancellation of the interfering signal, the at least one characteristic of the interfering signal includes modulation type, and/or the at least one characteristic includes one or more of pulse amplitude detection, fast Fourier transform (FFT), autocorrelation, Loëve spectrum, and/or Wigner-Ville functions.

BRIEF DESCRIPTION OF THE DRAWINGS

The foregoing features of this invention, as well as the invention itself, may be more fully understood from the following description of the drawings in which.

DETAILED DESCRIPTION

Figure 1:
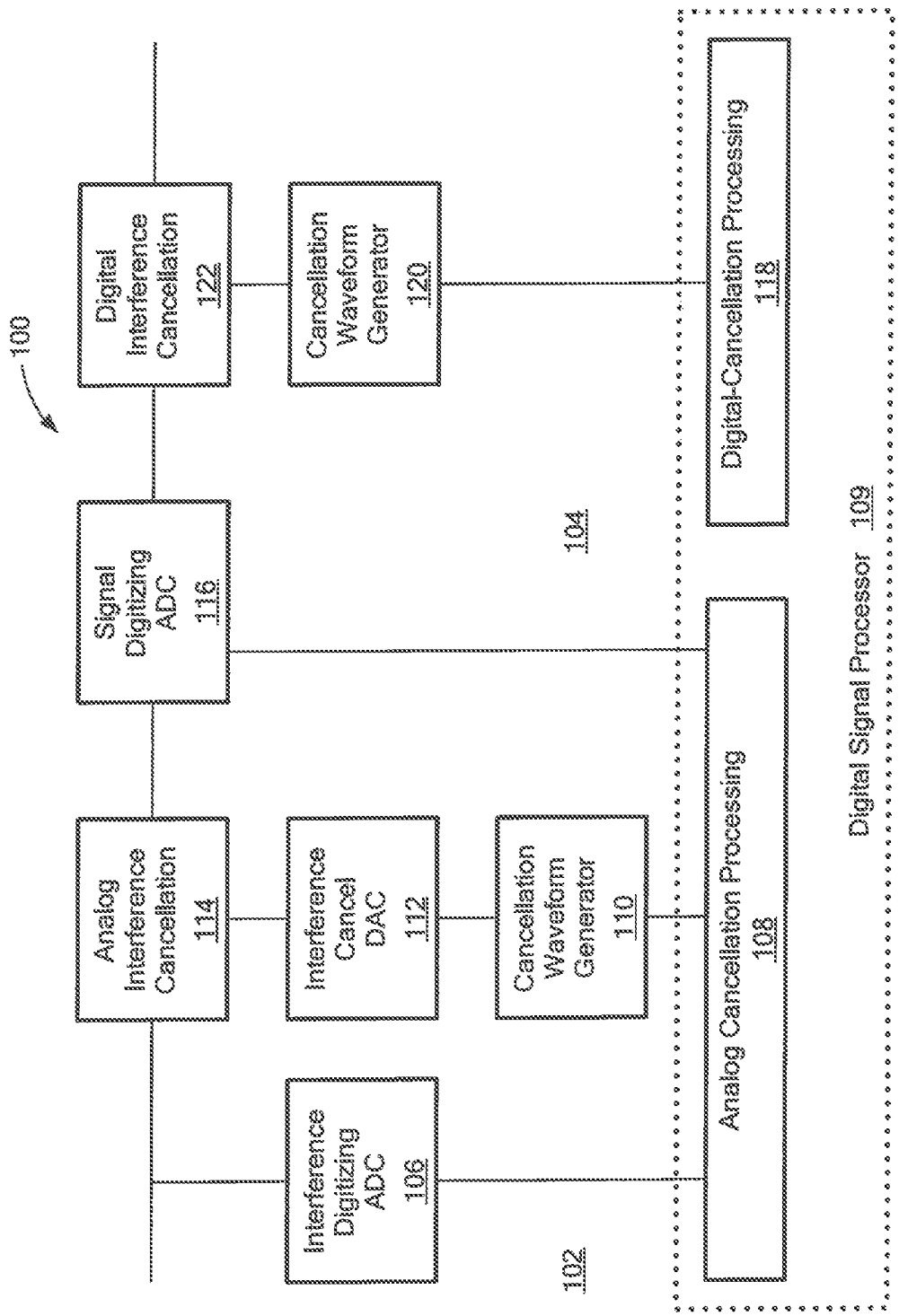
FIG. 1 shows an exemplary interference cancellation system having an analog interference cancellation stage and a digital interference cancellation stage in accordance with exemplary embodiments of the invention.

FIG. 1 shows a signal interference cancellation system 100 in accordance with exemplary embodiments of the invention. A first stage 102 provides coarse analog cancellation and a second stage 104 provides additional digital cancellation similar in operation to that of the analog cancellation but in the digital domain. In an exemplary embodiment, the combined analog and digital cancellation stages 102, 104 working together are believed to provide about 60 dB of total interference cancellation without degrading desired signal levels, greatly extending the dynamic range of receivers and demodulators.

The analog interference cancellation stage 102 includes a pre-cancel interference digitizing analog-to-digital converter (ADC) 106 coupled to an analog cancellation processing module 108. In an exemplary embodiment, a digital signal processor 109 includes the analog cancellation processing module 108 and a digital cancellation processing module 118. As described more fully below, the analog cancellation processing module 108 determines the modulation type (MT) for the interfering signal(s), sets up an MT model for each interferer, and provides initial estimates of MT model characteristic parameters. Once the MT model is set up, along with its characteristic parameters, a cancellation waveform generator 110 generates a signal that is projected/estimated forward in time to real-time cancel the interfering signal in the incoming received waveform. An interference cancel digital-to-analog converter (DAC) 112 converts the signal from the cancellation waveform generator 110 to the analog domain for the actual analog real-time cancellation in an analog interference cancellation module 114, which also receives the incoming received waveform. The analog interference cancellation module 114 outputs a new analog waveform with the interference removed to a large extent. The output of the analog interference cancellation module 114 is then processed by the digital stage 104, as described more fitly below.

In exemplary embodiments of the invention, the ADCs 106,116 and DAC 112 contain processor-controlled variable gain elements to optimize ADC and DAC resolutions as adaptive cancellation is achieved. In one embodiment, the gain of the interference digitizing ADC 106 is set low so that high-levels of interference do not saturate this ADC, while the gain of the signal digitizing ADC 116 is set high to take advantage of the analog cancellation. This higher gain improves signal detection capabilities and extends the dynamic range of the receiver significantly beyond limits imposed by the ENoB of the signal ADC 116, if it were utilized alone. In exemplary embodiments, the processor also utilizes digital calibration tables previously generated from component measurements to compensate for analog components imperfections, improving analog interference cancellation.

The digital interference cancellation stage 104 receives the processed signal after cancellation by the analog stage 102, further operating on the digitized waveform from the signal digitizing analog-to-digital converter 116. The digital cancellation processing module 118 processes this digital waveform, as described more fully below. A cancellation waveform generator 120 generates a digital signal input to a digital interference cancellation module 122 that removes at least a portion of remaining interfering signal. The digital cancellation processing module 118 receives the output signal from the digital interference cancellation module 122 to provide feedback for enhancing cancellation of the interfering signal. The output signal from the digital interference cancellation module 122 can provide a signal with total cancellation of about 60 dB, for example.

Figure 2:
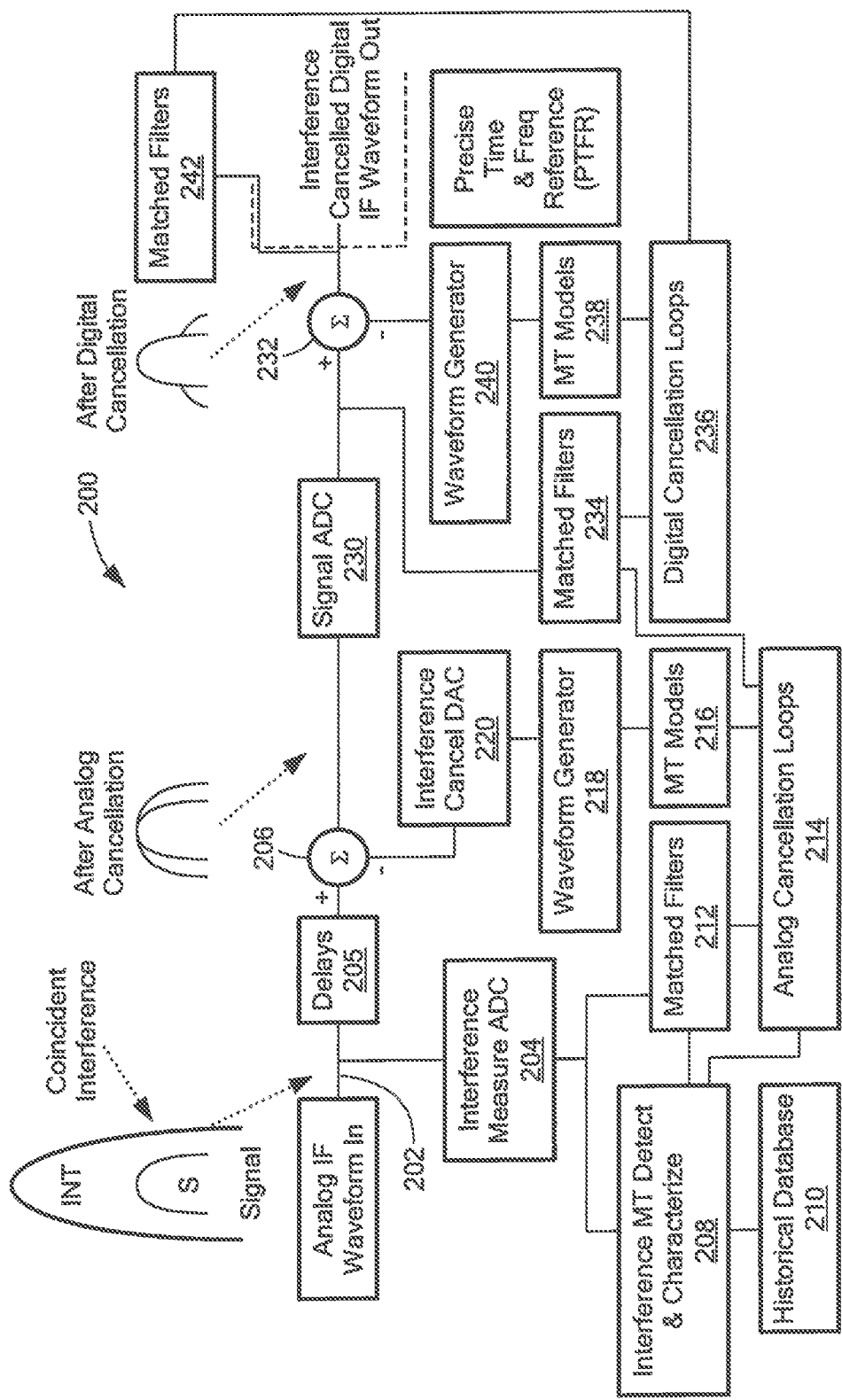
FIG. 2 is a schematic representation showing an exemplary implementation of an interference cancellation system having an analog interference cancellation stage and a digital interference cancellation stage in accordance with exemplary embodiments of the invention.

FIG. 2 shows further detail for the analog and digital interference cancellation stages 102, 104 of FIG. 1. In the illustrative embodiment, a received radio frequency (RF) analog waveform over a frequency band of interest includes one or more signals of interest (SOIs) and one or more interfering signals in the band of interest. This RF waveform is then either down-converted to an intermediate frequency (IF) or input directly for interference cancellation. In general, interfering signals of any practical frequency can be removed in accordance with exemplary embodiments of the invention, whether they are coincident with the frequencies of the SOIs or not.

It is understood that there are a variety of suitable techniques for removing interfering signals that are separated in frequency from those of the SOIs. However, frequency coincident interferers are not readily removable using conventional techniques. Exemplary embodiments of the invention utilize modulation type (MT) differences between the SOIs and interferers to detect, model, and cancel both coincident and non-coincident interferers without degrading the SOIs in the cancellation process, as described more fully below. For example, a radar signal has different MT characteristics than that of a communication signal.

In one particular embodiment, a system detects the presence of an the interferer of concern, characterizes its modulation type (MT), and makes a "hard" decision as to the specific MT of the interferer in setting up an adjustable parameter waveform model of the interferer to be used for cancellation purposes. Examples of appropriate adjustable parameters for a radar MT include pulse timing parameters, chirp or other pulse modulation parameters, and carrier frequency and phase parameters. Examples of appropriate adjustable parameters for a communications MT are carrier frequency and phase parameters, amplitude, phase, frequency, code division, or mixed modulation (FSK, ASK, QAM), modulation symbol order (binary, ternary, quaternary, BPSK, QPSK, etc.), modulation rates (Chip and data rates) and timing, symbol shaping, and the data symbols themselves. These MTs and parameters are known to those in the art. Because of this nonlinear hard decision and the adjustment of only parameters appropriate to the interferers MT by the cancellation processor, the system can cancel SOI coincident interferers with little or no inadvertent SOI degradation, so long as the interferers and SOIs have different MTs.

This is distinguished from linear cancellation techniques that rely totally on matched filters to separate the interferer from the SOI. Such linear techniques run into difficulty in cancelling nearly or exactly frequency coincident interferers because of the lack of orthogonality between the interferer and the SOI in a signal processing Hilbert space. Thus, such linear techniques tend to cancel more and more of the SOI along with the interference as coincidence is approached.

As can be seen in the upper left in FIG. 2, an interfering signal INT can dominate the SOI. In this situation, when the incoming waveform (interfering signal plus signal of interest) is provided to a first interference measuring ADC 204 for digitization, as in conventional systems, the digitized output is dominated by the high level interference and the gain before this ADC must be adjusted to avoid saturation of this ADC by the high level interference. In this situation, the SOI level can be below the least significant bit (LSB) of the ADC, and the 501 can be degraded or lost due the actual or effective number of bit (ENoB) limitations of the ADC. In contrast, in accordance with exemplary embodiments of the invention, the analog cancellation stage results in the analog waveform being input to a second post-analog-cancel signal digitizing ADC 230 is no longer dominated by interferers in the waveform. Here, the gain before this ADC can be increased to accommodate the SOIs resulting in much less degradation of the SOIs due to ADC ENoB limitations. This effectively increases the receiver dynamic range in the presence of large interferers. One skilled in the art will readily appreciate the advantage of this increased dynamic range.

The input waveform 202 is provided to interference measuring ADC module 204 and to an interference cancelling summer module 206 after an analog delay line 205. The ADC module 204 digitizes the interference dominated input waveform for digital processing by an adaptive modulation type (MT) interference detect and characterize module 208 and by MT-based interference matched filters 212 set up by the processor after the initial detection process, as described more fully below. In exemplary embodiments, the system is adaptive in the sense that new interferers are detected, their characteristics are determined, and these new interferers are cancelled on the fly during operation. Thus there is an accommodation period for new interferers where cancellation is first achieved and then improved before a steady state cancellation is reached. For new unknown interferers, the detect and characterize module 208 uses a variety of methodologies to detect and identify the MT of interferers and make initial estimates of their appropriate adjustable parameters. These methodologies include pulse amplitude detection, the fast Fourier transform (FFT), autocorrelation, the Loëve spectrum, Wigner-Ville functions, and other methodologies known to those adept in the art of signal detection and characterization. Because of the inherent high signal to noise ratio (SNR) of the high-level interference, their detection, MT characterization, and cancellation is quickly accomplished.

In one embodiment, a database 210 of historical signal data is used to aid in detecting and characterizing the MT of previously encountered interferers. Exemplary signals in the database 210 include a list of known interferers and many of their characteristic parameters, such as their carrier frequencies and MT parameters. Based on the detected modulation type, the interferer can be characterized and modeled, as described more fully below.

Based on a nonlinear hard decision as to the MT of each detected and characterized interferer, an MT-based adjustable parameter waveform model 216 and an MT-based matched filter 212 to optimally determine the interferer's parameter characteristics from the digitized signal at the ADC 204 are set up by the processor. Second post-analog-cancellation MT-based matched filters 234 are also set up by the processor to determine the residual presence of each interferer in the post-analog-cancel signal ADC 230 output.

Analog cancellation is accomplished first by summing interference MT model waveforms in a waveform generator 218, which drives a cancel digital to analog converter (DAC) 220 to produce the analog cancel waveform. Second, actual analog cancellation is performed in module 206, which comprises an analog summer module (Σ), well known in the art. The waveform generator 218 also projects the cancelling waveform forward in time to enable real-time analog cancellation in module 206. This forward projection accommodates processing delays in generating the cancellation waveform. The precise time and frequency reference 243 provides precise time and frequency signals so that forward time projection can be achieved with sufficient accuracy to achieve proper cancellation. An analog delay line 205 in the path between the input signal 202 and cancellation module 206 delays the signal to further accommodate processing delays. This is useful in dealing with communication interferers that have data changes that cannot be predicted in advance. In accommodating these data changes, the fact that a high level interferer is received with a very high signal to noise ratio is utilized to determine the data change in much less than a symbol period. Included in waveform generator 218 are calibration tables that correct for analog component imperfections. These calibration tables are determined prior to operation and increase the level of analog interference cancellation that can be achieved.

Also contained in the processor are analog cancellation loop modules 214 that utilize the pre and post cancel outputs from the matched filters 212 and 214 to continually optimize analog interference cancellation by adjusting MT model 216 parameters. Such loop modules are well known in the art and, in this embodiment, are based on minimizing can square differences between the incoming data and model outputs, a technique also known to those in the art. Again, the fact that only parameters appropriate to the chosen MT model are adjusted minimizes inadvertent 501 cancellation when there is interference-SOI frequency coincidence.

Figure 4:
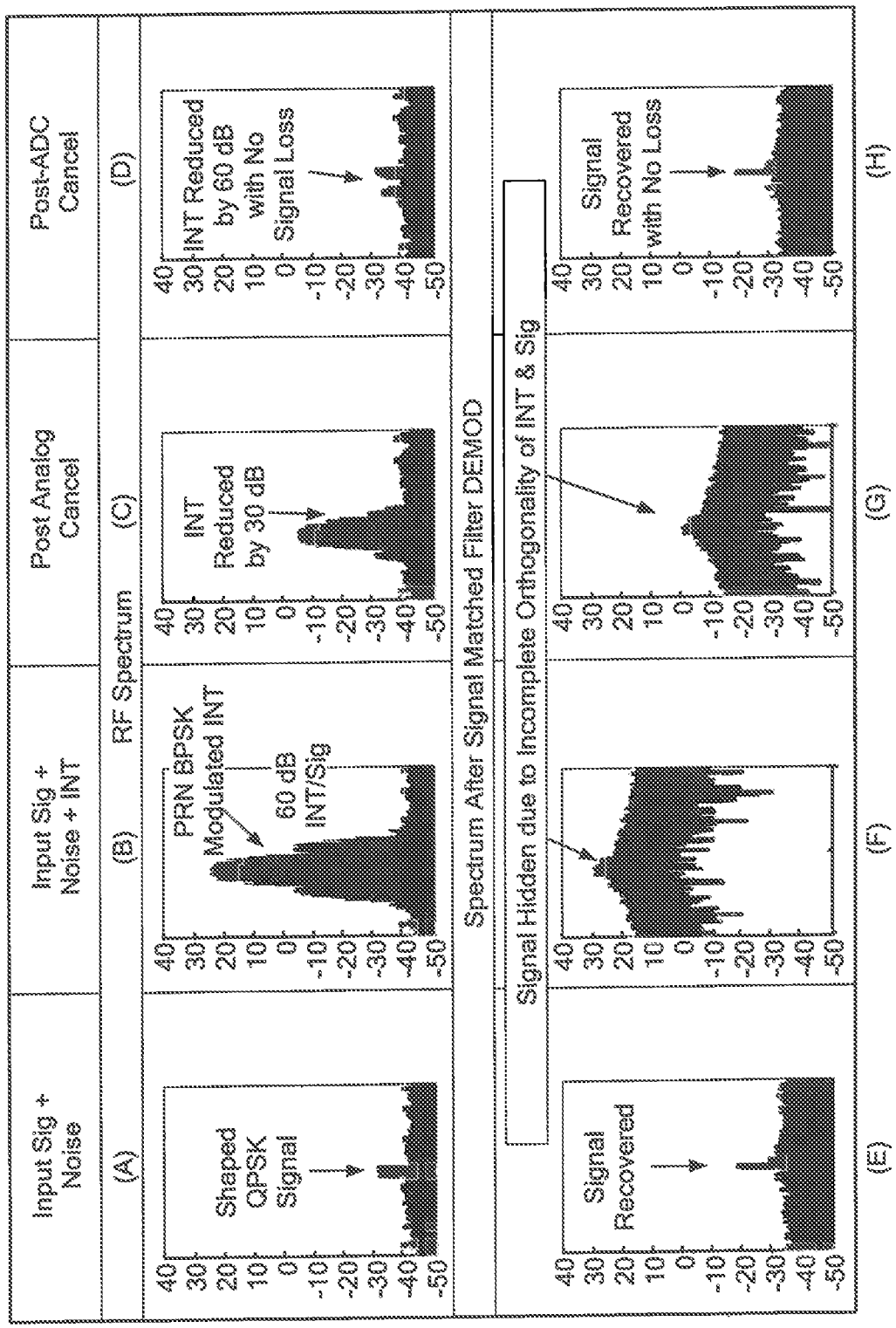
FIG. 4 is a graphical representation of simulation results predicting the performance of the invention in the presence of coincident interfering and signal waveforms.

The digital interference cancellation stage operates on the analog interference cancelled digital output of the signal ADC 230 to achieve further interference cancellation totally in the digital domain. Simulations of exemplary embodiments of the invention in FIG. 4 show that the combined stages are expected to achieve a total interference cancellation level of 60 dB. This digital stage utilizes pre-digital cancel matched filters 234, post-digital cancel matched filters 242, MT models 328, digital cancellation loops 236, digital summer 232, and waveform generator 240 (with no cancel DAC, since cancellation is digital) to implement MT-based nonlinear cancellation in a fashion similar to that of the analog cancellation stage. It is noted that information is shared between the analog and digital stages to improve overall performance.

It is understood that the amount of interference reduction can vary based upon various signal characteristics, such as ratio of interferer to signal of interest, strength of interferer, strength of signal of interest, modulation type, etc. It is further understood that the amount of interference reduction corresponds to the accuracy of the modulation type processing. For example, while radar signals may be relatively predictable, other interferers, such as communication signals, may be relatively unpredictable.

It is understood that adaptive modulation type detection and characterization can be performed using a variety of established techniques. These include pulse amplitude detection, the fast Fourier transform (FFT), autocorrelation, the Loëve spectrum, Wigner-Ville functions, and other methodologies known to those adept in the art of signal detection and characterization. Signals are detected and characterized by MT and other parameters. Parameter optimization loops include generating optimized running estimates of separate signal parameters, utilizing current and historical, including a priori, data, and using update data based on cancellation results. Pre-cancelation matched filter estimation can use generated waveform estimates of separate signals. Active cancellation loops cancel interference and/or distortion based on waveform estimates. Post-cancelation matched filter estimation measures residual interference and feedback information to optimize parameter and waveform estimators and provides feedback of desired signal post-cancellation information to further optimize loops.

In exemplary embodiments, processing coordinates both in-band and out-of-band interference cancellation. For out-of-band interference, conventional techniques, such as band-pass and notch filtering are utilized. For in-band interference that is not frequency coincident, these conventional filtering techniques are also utilized. For SOI-coincident in-band coincident interferers and SOI-coincident intermodulation and harmonic distortion products generated by non-coincident interferers, the nonlinear techniques described previously are utilized. In exemplary embodiments, a precise time and frequency reference (PTFR) module 242 can be used for stringent phase/time and frequency stability for optimizing cancellation.

Figure 3:
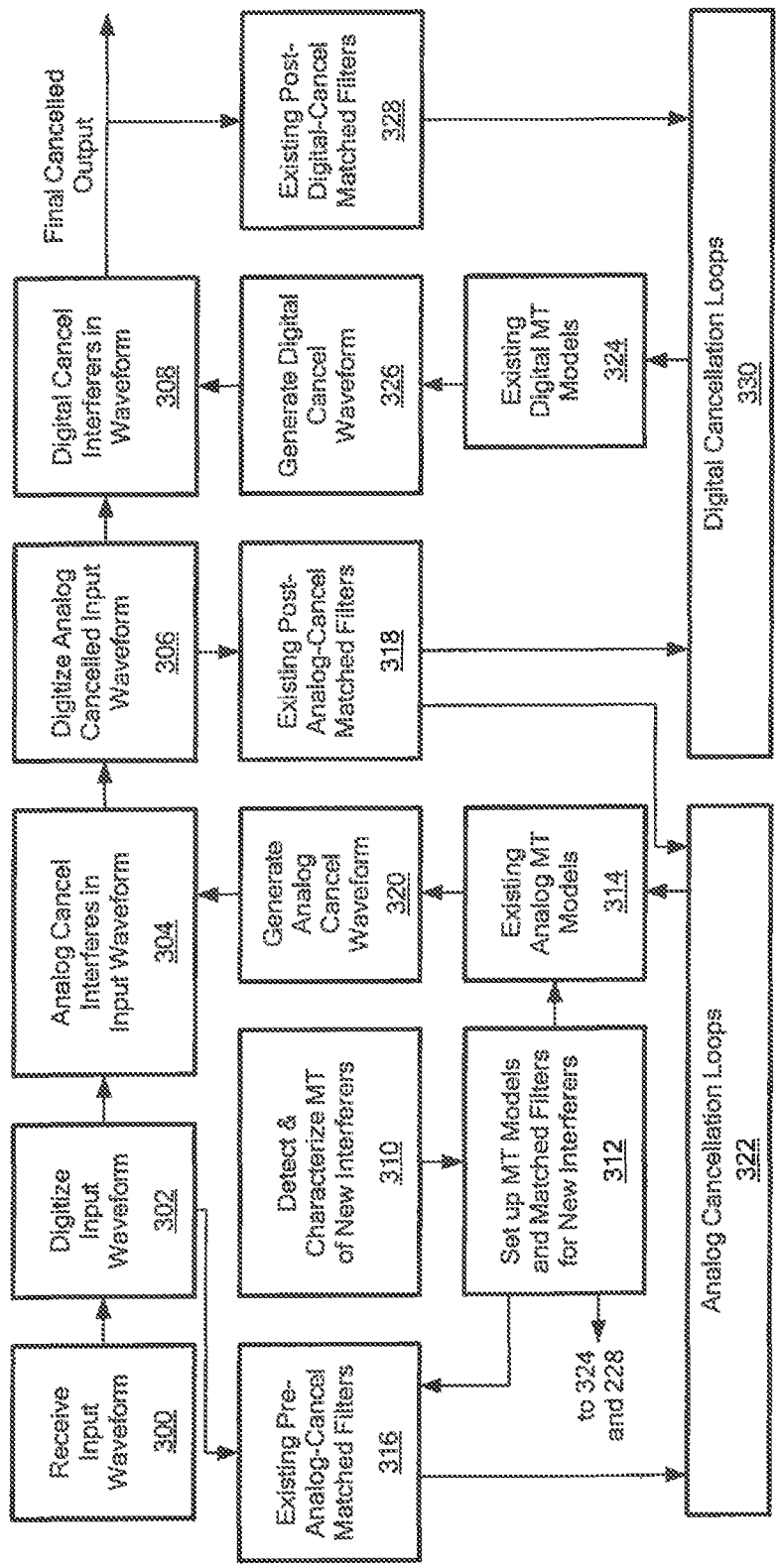
FIG. 3 is a flow diagram showing an exemplary sequence of steps for implementing interference cancellation having an analog interference cancellation stage and a digital interference cancellation stage in accordance with exemplary embodiments of the invention.

FIG. 3 shows an exemplary sequence of steps to provide removal of an interfering signal in accordance with exemplary embodiments of the invention. In step 300, an input analog waveform containing one or more a signals of interest and one or more interfering signals is received. In step 302, the input signal is digitized. In step 310, new interferers are detected and their MTs and MT parameter characteristics are determined. In step 312, after a hard decision as to their MT, MT models and matched filters are set up for these new interferers and enter into the pool of existing analog MT models 314, pre-analog-cancel matched filters 316, post-analog-cancel matched filters 318, digital MT models 324, and post-digital-cancel matched filters 328. In parallel, the existing analog MT models 314 are projected forward in time and combined into a total analog interference cancel waveform 320, so that real-time analog cancellation 304 can be performed on the input waveform. This analog cancelled waveform is then digitized 306 and fed to the existing post-cancel matched filters 318. Also in parallel, based on the outputs of the pre and post analog cancelled matched filters 316 and 318, analog cancellation loops 322 optimize the MT model parameters for best mean square cancellation.

In the exemplary sequence shown in FIG. 3, remaining interference in the digitized post-analog-cancel waveform 306 is further digitally cancelled 308 in a fashion similar to that of the analog cancellation segment. This is accomplished using digital interference cancel waveform generation 326, digital MT models 324, post-digital-cancel matched filters 328, and post-analog-cancel-matched filters 318.

FIG. 4 shows exemplary waveform simulations for removing an interfering signal in accordance with exemplary embodiments of the invention. The RF spectrum of an input signal with noise is shown in FIG. 4A and that of an input signal with noise and an interfering signal is shown in FIG. 4B. FIG. 4C shows the spectrum of the signal after analog processing to remove the interfering signal. FIG. 4D shows the spectrum of the signal after further removal of the interfering signal in the digital domain. FIGS. 4E-H show the spectrum for the respective signals of FIGS. 4A-D after desired-signal matched-filter demodulation (DEMOD). This second set of figures shows how the signal and interference would appear after further processing in a signal-matched receiver operating on the waveform at various stages in an exemplary invention embodiment corresponding to FIGS. 4A-D.

Figure 5:
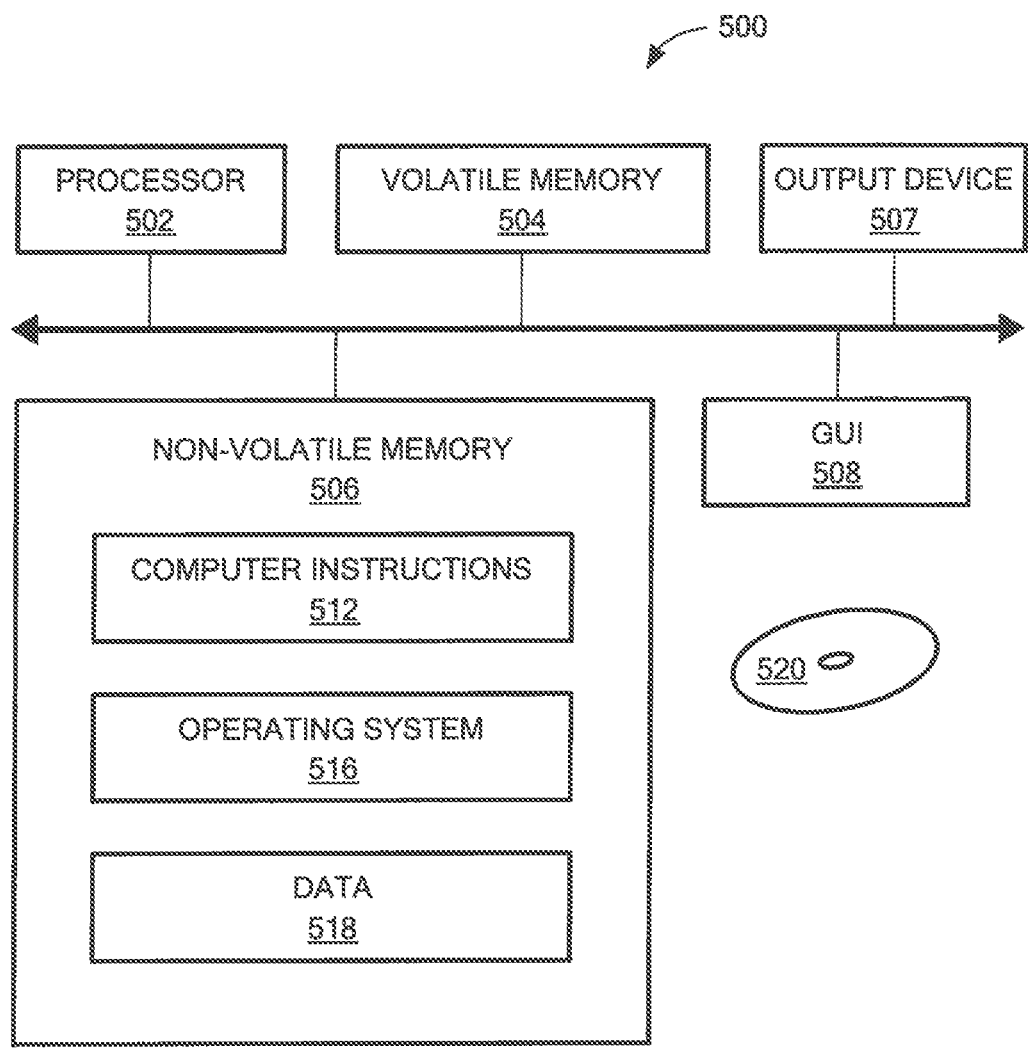
FIG. 5 is a schematic representation of an exemplary computer that can perform at least a portion of the processing described herein.

In exemplary embodiments, digital signal processing can be accomplished using the exemplary computer in FIG. 5 or a variety of field programmable gate arrays (FPGA) or application specific integrated circuits (ASICs).

FIG. 5 shows an exemplary computer 500 that can perform at least part of the processing described herein. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or a ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system, comprising:
an analog cancellation stage to receive an input signal having a signal of interest and one or more interfering signals of unknown modulation type (MT), comprising:
a first ADC to digitize the input signal;
a first signal processing module configured to process the digitized input signal including to detect the presence of the one or more interfering signals and characterize the MT of each of the one or more interfering signals by comparison to a library of MTs for making a non-linear hard decision of modulation type for each of the one or more interfering signals and generating a parameter adjustable MT model and matched filter MT detectors for non-linearly cancelling each of the one or more interfering signals by adjusting the parameters in the MT models to maximize cancellation;

a first cancellation signal generator coupled to the first signal processing module and configured to generate a digital first interference cancellation waveform from the parameter-adjusted interferer MT models generated by the first signal processing module;

a DAC coupled to the first cancellation signal generator to transform the first interference cancellation signal from the digital domain to the analog domain for cancelling the one or more interfering signals; and an analog removal module coupled to the DAC to subtract the first interference cancellation signal from the input signal and provide an analog first cancellation output signal;

a second ADC coupled to the analog removal module to digitize the analog first cancellation output signal; and a digital cancellation stage coupled to an output of the second ADC, the digital cancellation stage comprising:

a second signal processing module configured to process the digital output signal from the second ADC with further MT model-based interference cancellation and to provide feedback to the first signal processing module to optimize the cancellation of the one or more interfering signals;

a second cancellation signal generator coupled to the second signal processing module to optimize digital cancellation; and a digital interference removal module coupled to the output of the second ADC and to the second cancellation signal generator module for further removing the interfering signals in the digital domain.

2. The system according to claim 1, wherein the first signal processing module comprises a matched filter module.

3. The system according to claim 1, wherein the first signal processing module comprises a signal database.

4. The system according to claim 1, wherein the first signal processing module comprises analog cancellation loops.

5. The system according to claim 1, further including a feedback path from the first signal processing module to the digital cancellation stage.

6. The system according to claim 1, further including a time and frequency reference module.

7. A method, comprising:

performing analog cancellation stage on an input signal having a signal of interest and one or more interfering signals of unknown modulation type (MT), comprising:

employing a first ADC to digitize the input signal;

employing a first signal processing module to process the digitized input signal including to detect the presence of the one or more interfering signals and characterize the MT of each of the one or more interfering signals by comparison to a library of MTs for making a non-linear hard decision of modulation type for each of the one or more interfering signals and generating a parameter adjustable MT model and matched filter MT detectors for non-linearly cancelling each of the one or more interfering signals by adjusting the parameters in the MT models to maximize cancellation;

employing a first cancellation signal generator coupled to the first signal processing module and configured to generate a digital first interference cancellation waveform from the parameter-adjusted interferer MT models generated by the first signal processing module;

employing a DAC coupled to the first cancellation signal generator to transform the first interference cancellation signal from the digital domain to the analog domain for cancelling the at least one interfering signals; and employing an analog removal module coupled to the DAC to subtract the first interference cancellation signal from the input signal and provide an analog first cancellation output signal;

employing a second ADC coupled to the analog removal module to digitize the analog first cancellation output signal; and employing a digital cancellation stage coupled to an output of the second ADC, the digital cancellation stage comprising:

a second signal processing module to process the digital output signal from the second ADC with further MT model-based interference cancellation and to provide feedback to the first signal processing module to optimize the cancellation of the at least one interfering signal;

a second cancellation signal generator coupled to the second signal processing module to optimize digital cancellation; and a digital interference removal module coupled to the output of the second ADC and to the second cancellation signal generator module for further removing the interfering signals in the digital domain.

8. The method according to claim 7, further including using feedback from analog cancellation to enhance digital cancellation.

9. The method according to claim 7, wherein the at least one characteristic of the interfering signal includes modulation type.

10. The method according to claim 9, further including performing modulation type detection and characterization using at least one of: pulse amplitude detection, fast Fourier transform (FFT), autocorrelation, Loëve spectrum, or Wigner-Ville functions.

11. The method according to claim 7, further including using a historical signal information to create the first cancellation signal.

12. The method according to claim 7, further including delaying the analog input signal prior to removing the first cancellation signal from the input signal and providing an analog output signal.

13. The method according to claim 7, further including using a summer for removing the first cancellation signal from the analog input signal and providing an analog output signal.

14. A system, comprising:

a first means for cancelling to receive an input signal having a signal of interest and an interfering signal of unknown modulation type and to cancel the interfering signal from the input signal in an analog domain based on at least one characteristic of the interfering signal using a non-linear modulation type (MT) model; and a second means for cancelling to receive an output from the first means having the signal of interest and remaining portions of the interfering signal, the second means to further remove the remaining interfering signal in a digital domain, wherein the first means for cancelling further uses modulation type differences between the signal of interest and the interfering signal for cancelling the interfering signal by making a nonlinear hard decision of modulation type for the interfering signal and, selecting waveform parameter estimates for the non-linear MT model for the interfering signal based on the nonlinear hard decision of modulation type.

15. The system according to claim 14, further including a feedback means to provide feedback to the second means for cancelling from the first mean for cancelling to increase cancellation of the interfering signal.

16. The system according to claim 14, wherein the at least one characteristic of the interfering signal includes modulation type.

17. The system according to claim 14, wherein the at least one characteristic includes one or more of pulse amplitude detection, fast Fourier transform (FFT), autocorrelation, Loève spectrum, and/or Wigner-Ville functions.

\* \* \* \* \*